Nov. 30, 1965          E. S. JOLINE          3,221,169
ELECTROLUMINESCENT GRAPHICAL DISPLAY DEVICE
Filed July 9, 1962                               2 Sheets-Sheet 1

INVENTOR.
EVERETT S. JOLINE
BY
S.C. Yeaton
ATTORNEY

INVENTOR.
EVERETT S. JOLINE

United States Patent Office 3,221,169
Patented Nov. 30, 1965

3,221,169
ELECTROLUMINESCENT GRAPHICAL
DISPLAY DEVICE
Everett S. Joline, Huntington Station, N.Y., assignor to Sperry Rand Corporation, Great Neck, N.Y., a corporation of Delaware
Filed July 9, 1962, Ser. No. 208,219
9 Claims. (Cl. 250—209)

This invention relates to data readout systems and more particularly to graphical readout means for digital devices.

Readout devices are frequently desired in which the length of an indicator line represents the numerical value of a digital input signal. The data can be displayed in such devices in the form of a graph that can be interpreted quickly and accurately.

Readout devices of this kind are useful, for instance, where several sets of related data are to be compared. The individual display devices can be placed adjacent to one another so that the lengths of the various indicator lines can be observed simultaneously.

Prior art methods for obtaining such graphical displays typically employ meters, servomechanisms, or cathode ray tubes. These devices usually operate in response to an analogue signal so that data in the digital form must first be converted in a digital-to-analogue converter in order to operate the readout device. In addition to such converters, other auxiliary equipment is required with many of the prior art devices so that the overall system is necessarily cumbersome. Furthermore, many of the prior art readout devices are incapable of storing information after the input signal has been removed. Such devices require external storage means that add to the cost and complexity of the overall system.

It is an object of the present invention to provide a graphical type readout means that is compact and light in weight.

It is another object of the present invention to provide a graphical type display device that operates directly from digital data without the necessity of auxiliary conversion means.

It is a further object of the present invention to provide a graphical type display device that can retain information after removal of the signal input.

These and other objects are achieved in the present invention by providing an illuminable indicator line formed from individual luminescent segments, each corresponding to a specific value of digital input signal and each capable of actuating lower-valued segments so as to "fill-in" the indicator line.

The invention will be described with reference to the following drawings wherein.

Figure 1:
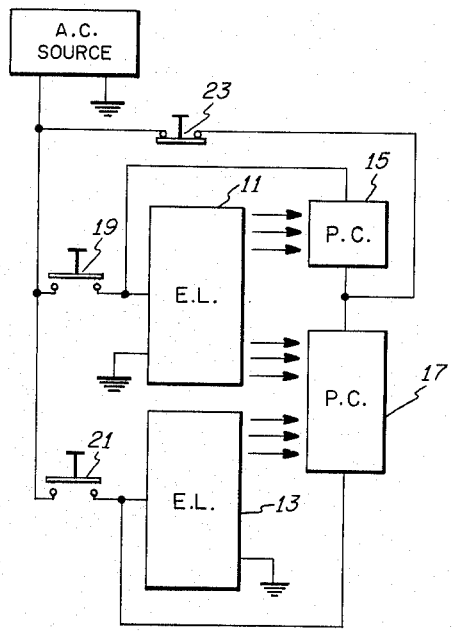
FIG. 1 is a block diagram useful in explaining the operation of the invention.

FIG. 1 illustrates the theory of operation of the invention. Two electroluminescent segments, 11 and 13, are arranged so that a photoconductive lock-in cell 15 can be illuminated by the segment 11 whereas a photoconductive lock-in cell 17 can be illuminated by either the segment 11 or the segment 13.

The electroluminescent segments are formed as bodies containing phosphors that emit a seemingly steady light when energized by a suitable alternating voltage. The photoconductive cells employ certain light sensitive materials that decrease in electrical resistance when illuminated from a suitable source. Both kinds of device are described in U.S. Patent No. 2,926,263, issued to Benjaman Kazan on February 23, 1960.

Voltage from a suitable A.C. source can be supplied to the individual electroluminescent segments by means of the actuating switches 19 and 21. The photoconductive cells 15 and 17 are electrically shunted across the normally open switches 19 and 21, respectively.

The electroluminescent segment 13 is actuated by closing the switch 21. The resultant light from this segment impinges on the photoconductive cell 17 and causes the resistance of this cell to decrease. This decrease in resistance establishes a current path sufficient to maintain or "hold" the segment 13 in the illuminated condition even though the switch 21 is subsequently opened. Since the cell 17 is electrically in series with the segment 13 only, it does not affect the segment 11.

The segment 11 is actuated by closing the switch 19. The resultant light from this segment illuminates both photoconductive cells and causes the resistance of each of these cells to decrease. The current path thus established through the cell 15 is sufficient to maintain or "hold" segment 11 in the illuminated condition; the current path established through the photoconductive cell 17 is sufficient to initiate and to maintain illumination in the segment 13.

The electroluminescent segments remain in the illuminated state until the lock-in circuits are interrupted by opening a normally closed erase switch 23.

By providing a suitable physical arrangement, the light from the segments 11 and 13 can be used as a visual indication of the state of the circuit as well as a means for locking-in the appropriate circuits. It can be seen that closure of the lower switch 21 actuates only the lower segment 13, thereby providing the visual effect of an illuminated line of unit length. Closure of the switch 19, however, causes both segments to luminesce, thus providing the visual effect of an illuminated line two units in length.

The cell 15 functions as a holding means to maintain the segment 11 in the illuminated condition after the switch 19 is opened.

The cell 17, however, performs a dual function. The portion of the cell illuminated by the segment 11 forms a fill-in means, functioning to illuminate the lower segment 13 and thus "fill in" the visual indicator line. The portion of the same cell illuminated by the segment 13, to which the cell is electrically connected, functions as a holding means to maintain the segment 13 in the illuminated condition after the switch 21 is opened.

It will be noticed that each electroluminescent segment and its associated photoconductive cell are in a regenerative feedback relationship. Moreover, each photoconductive cell is in parallel with the associated actuating switch. Ordinarily, if an abnormally high resistance should appear in the actuating switch circuit, this resistance could so limit the current that the associated segment could never reach full brilliance. The regenerative feedback relationship, however, overcomes this difficulty. Whatever light is produced acts on the associated photoconductive cell so as to permit increased current to flow to the segment. This effect is cumulative and continues until the segment reaches full brilliance.

The basic circuit can be expanded to provide a display in which a luminous line indicator can be formed with any reasonable number of illuminable segments, arranged in any desired pattern. An additional photoconductive cell must be provided for each additional electroluminescent segment.

It will be appreciated that means other than the electroluminescent phosphor segments can be used in such a display device. The principle of optically coupling lower-valued luminous members so as to fill in an indicator line can be applied to systems utilizing almost any kind of electrically activated light source. Luminescent glow lamps, such as neon bulbs can be used, for example, with the same basic circuit. The use of phosphor type elements is presently preferred, however, because they are compact, rugged, and fast-acting.

Figure 2:
FIG. 2 is a diagram, partly in block form, illustrating a readout device constructed according to the principles of the invention.

FIG. 2 illustrates a practical readout device embodying the principles of the invention. A bar graph display 25 is energized in accordance with the output signal from a logic circuit 27. The logic circuit contains a plurality of output terminals and operates to connect one line from an A.C. source selective to individual output terminals in accordance with the input signal. The mode of operation of the logic circuit depends upon the particular application. It can, for instance, comprise a simple selector switch or stepping switch. A specific logic circuit will be described later.

Figure 3:
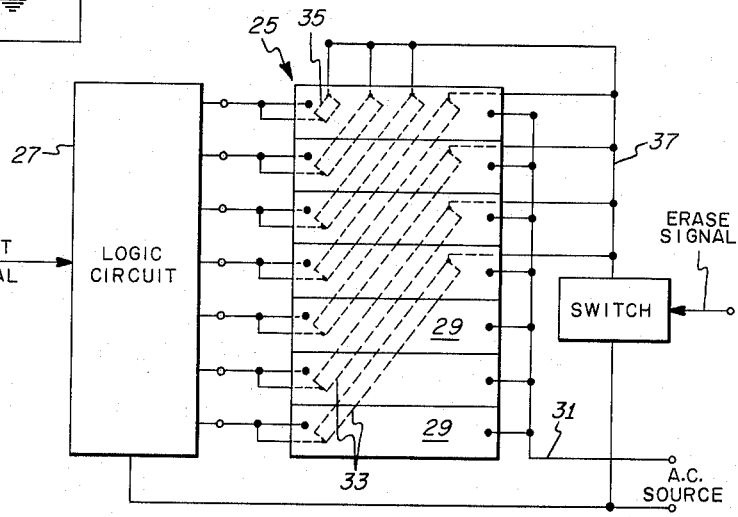
FIG. 3 is an exploded perspective view, useful in explaining the construction of the device of FIG. 2.
Figure 3:
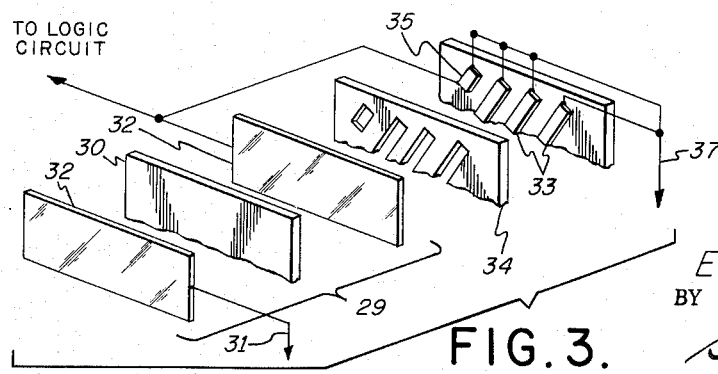

The construction and operation of the bar graph display 25 can best be understood by referring to both FIG. 2 and FIG. 3. The display 25 contains a number of electroluminescent segments 29. A layer 30, comprises an electroluminescent phosphor imbedded in a suitable dielectric material. This layer conveniently is made to extend throughout the full height of the display means 25. Each segment can then be formed by applying a pair of transparent conductive films 32 to the appropriate region of the layer 30. The individual pairs of conductive films are electrically insulated from one another. Each pair, together with the intervening portion of the layer 30, forms a luminous capacitor. A segment 29 is provided for each output terminal on the logic circuit. One side of each segment is connected to the A.C. source by means of a common connector 31. The opposite side of each segment is connected to the respective output terminal on the logic circuit.

A layer of lock-in cells, in the form of strips of photoconductive material 33, is placed behind the segments 29. An opaque mask 34, having apertures registering with the lock-in cells is inserted between the segments 29 and the lock-in cells. Such a mask confines the light to the desired lock-in cells.

The first lock-in cell 35 is so arranged that it is illuminated by the uppermost segment only. Each additional lock-in cell is arranged so as to be illuminated by two or more adjacent segments.

Although the lock-in cells need to couple only two adjacent segments in order to "fill-in" the graphical display, it is desirable to couple the lock-in cells to several adjoining segments. The arrangement depicted in FIG. 2 provides such multiple coupling by using cells in the form of relatively narrow photoconductive strips straddling several segments. A small but finite time is required to actuate an adjoining segment by optical coupling means. Multiple coupling reduces the time required to "fill-in" a graphical display since illumination of one segment not only affects the adjacent segment but simultaneously affects more remote segments as well. The photoconductive strips can conveniently be positioned in an oblique fashion as illustrated.

Each lock-in cell is electrically connected to the electroluminscent segment adjacent its lower end, and thus to the corresponding output terminal of a logic circuit. The upper end of each cell is connected through a common bus 37 to the same side of the A.C. source that is connected to the logic circuit.

When the logic circuit provides a signal that illuminates any segment, the photoconductive means operates to actuate any lower-valued segments. A current path is established through the photoconductive means to the lower-valued segment. Illumination of a given segment does not actuate higher-valued segments because the upper ends of the photoconductive means are not connected to these segments and a current path cannot be established to such segments.

A switch that can be opened by an erase signal is inserted in the common bus 37. Erase signals are customarily applied at regular intervals in order to permit the reading on the display means to be updated. If the input signal changes so that fewer segments should be illuminated, the lock-in cells would prevent the appropriate segments from being extinguished. The erase signal extinguishes all segments momentarily so that the reading corresponding to the latest input signal can be appropriately displayed thereafter.

Figure 4:
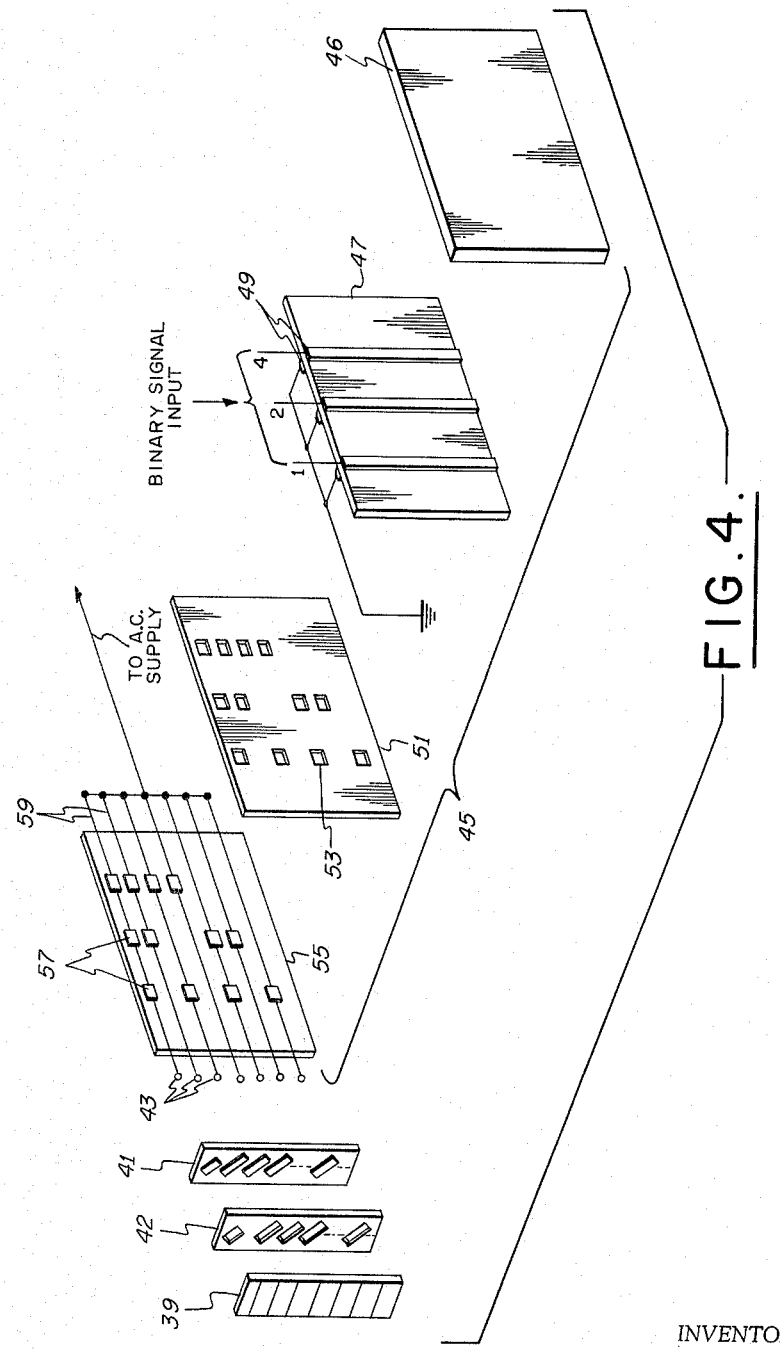
FIG. 4 is an exploded perspective view of a particular readout device embodying the principles of the invention.

FIG. 4 illustrates the construction of specific readout device embodying the principles of the invention.

The readout device employs a bar graph display means 39. A layer of photoconductive lock-in cells 41 is arranged behind this display means. These cells, only a few of which have been shown, are arranged in a diagonal pattern as explained in reference to FIG. 2. An opaque mask 42 contains apertures that register with the lock-in cells so as to ensure that light from any given display segment actuates only the associated lock-in cell. The display means and the lock-in cells are eventually connected to the output terminals 43 of the logic means in the manner previously described. The logic element 45 is designed to accept three bit binary input signals. The entire readout device is constructed in substrate form. Printing techniques, such as the silk screen process, may be used to deposit all materials in thin layers on to a suitable base plate 46. Such techniques are described in the Kazan patent previously cited. An electroluminescent phosphor layer 47 is provided with pairs of conducting strips 49. The two strips in each of these pairs are arranged on opposite sides of the layer 47, and a pair of strips is provided for each input terminal or bit in the binary code being used. The strips on the side of the layer 47 remote from the base plate are formed from a transparent conducting material. A punched card mask is next applied over the layer 47. This mask is formed from an opaque material and contains apertures 53 arranged in vertical columns over the strips 49. A photoconductive decoder matrix 55 is applied over this mask. The matrix contains a number of photoconductive decoder cells 57 arranged to register with the apertures in the mask 51. These cells are arranged in horizontal rows and each row is connected in an electrical series arrangement between the A.C. supply and the logic output terminals 43 by means of the conductors 59. The cells are arranged in the form of a logical matrix so as to provide a decoding function according to known techniques. Thus, for example, an input signal having a value of six units will be applied to the "2" and "4" input terminals. The input signal will cause the phosphor under the corresponding two pairs of strip 49 to luminesce thereby illuminating the photoconductive cells in the sixth row.

The logic matrix of FIG. 4 has an added advantage in that it reduces the fill-in time for higher-valued signals. This matrix directly actuates not only the display segment corresponding to the value of the input signal, but certain lower-valued segments as well. Thus in the example assumed previously, an input signal having a value of six units will actuate the second and fourth segments as well as the desired sixth segment. As soon as these segments are actuated, the fill-in means associated with each of these three segments will begin to operate simultaneously so as to complete the fill-in operation in less time than would be required if the fill-in operation proceeded from the sixth segment alone.

The various display means and logic circuits have been illustrated with only a few segments and correspondingly few input terminals in order to present relatively simple diagrams. In many instances, however, it will be appreciated that more display segments would be desired. A typical display means might contain 127 segments in a length of approximately 4 inches and be actuated through a logic element having 7 input terminals.

A decoder matrix of this type is so constructed that the higher-valued display segments are connected in series with rows of several photoconductive cells. The uppermost row, for instance, contains a cell for each bit in the particular binary code being used. Some designs may involve binary codes having a large number of bits, in which case the total resistance of the upper rows would be appreciable even though each cell in the row is illuminated. This would ordinarily prevent the associated electroluminescent display segment from achieving full brilliance. The lock-in cells, however, overcome this difficulty since they are in a regenerative feedback relationship with the display segment and cooperate with this segment to bring it to full brilliance even though the logic circuit provides a feeble actuating signal. Since each cell is illuminated to full brilliance, the resultant graphical display appears as an illuminated line of uniform brightness.

The lock-in cells also decrease the time necessary for the individual segments to reach full brilliance. A finite time is required for the resistance of a photoconductive cell to decrease to a new value when the cell is illuminated. The regenerative feedback provided by the lock-in cells, however, acts to increase the effective rate of change of the total circuit resistance in series with the electroluminescent segment.

It will be appreciated that many variations of the readout device of FIG. 4 are possible. A circular display means, for instance, may be substituted for the bar graph display 39. For such a circular display, a tubular base plate can be conveniently substituted for the flat base plate 46. The decoder matrix 45 can then be formed on a curved surface of the tubular base and the display means applied to one end of this tubular base.

The logic circuit depicted in FIG. 4 is representative of a wide variety of logic circuits that may be used with the display means of the present invention.

Furthermore, logic circuits employing diodes, non-linear resistors, or other switching devices may be used to actuate the display means if so desired.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a first photoconductive means and a first electrically luminescent means connected in electrical series relationship so that the same current flows through each of these means, a second photoconductive means and a second electrically luminescent means connected in electrical series relationship so that the same current flows through each of these means, said first photoconductive means being in the form of a strip adjacent and straddling both electroluminescent means, said second photoconductive means being adjacent the second electroluminescent means only.

2. A digital display device comprising a source of voltage, a first photoconductive means and a first electroluminescent means connected in a first electrical series circuit across said source, a second photoconductive means and a seond electroluminescent means connected in a second electrical series circuit in parallel with said first series circuit, first and second switching means shunting the first and second photoconductive means respectively, said first photoconductive means being in the form of a strip adjacent and straddling both electroluminescent means, said second photoconductive means being adjacent the second electroluminescent means only.

3. A visual readout means in which the length of an illuminated line represents the value of an input signal comprising a source of voltage, a plurality of discrete luminescent segments arranged along said line, a logic circuit to connect the segment corresponding to the value of the input signal across the voltage source, optical holding means to maintain a segment in the illuminated condition after the input signal is removed, and individual fill-in means optically coupling each segment to a lower-valued segment.

4. A visual readout means in which the length of an illuminated line represents the value of an input signal comprising a source of voltage, a plurality of discrete luminescent segments arranged along said line, a logic circuit to connect the segment corresponding to the value of the input signal to the source of voltage, and photoconductive lock-in means shunting said logic circuit, said photoconductive means being arranged to receive light from an illuminated segment, said photoconductive means also being optically as well as electrically coupled to a segment lower in value than an illuminated segment.

5. A visual readout means in which the length of an illuminated line represents the value of an input signal comprising a source of voltage, a plurality of discrete luminescent segments arranged along said line, a logic circuit to connect the segment corresponding to the value of the input signal to the source of voltage, photoconductive lock-in cells shunting said logic circuit, and conducting means connecting individual lock-in cells to the respective luminescent segments, said lock-in cells being optically coupled to a plurality of neighboring segments.

6. A visual readout means of the type in which the length of an illuminated line indicates the value of an electrical input signal comprising a plurality of luminescent segments arranged along said line, each of said segments corresponding to a specific value of the input signal, a first photoconductive lock-in cell electrically coupled to the highest-valued of said segments, said first photoconductive lock-in cell being optically coupled to receive light only from said highest-valued segment, a plurality of additional lock-in cells optically coupled to said highest-valued segment, each of said additional lock-in cells being electrically and optically coupled to individual segments corresponding to successively lower-valued signals, said additional lock-in cells being further optically coupled to any intervening segments.

7. A visual readout means for a binary coded input signal comprising:
   (a) a decoder matrix,
   (b) a plurality of output leads on said matrix, each of said leads corresponding to a decimal equivalent of a specific binary coded input signal,
   (c) an elongated graphical display device,
   (d) said display device including a plurality of luminescent segments individually connected to each matrix output lead,
   (e) said segments being arranged along the axis of said graphical display device so as to respond progressively to successively higher input signal values,
   (f) a first lock-in cell electrically and optically coupled to the segment representing the highest-valued input signal,
   (g) additional lock-in cells,
   (h) each additional lock-in cell comprising a holding means and a fill-in means,
   (i) each of said holding means being electrically as well as optically coupled to a given individual segment,
   (j) each of said fill-in means being optically coupled to a given individual segment and electrically coupled to the next lower-valued segment,
   (k) a common bus for energizing each of said lock-in cells, and an erase switch to interrupt the flow of current in said bus.

8. A readout means for a binary coded input signal comprising:

(a) an electroluminescent layer,
(b) a plurality of signal input terminals on said layer,
(c) a pair of conducting strips for each input terminal the individual strips in each pair being disposed on opposite sides of the electroluminescent layer,
(d) a first opaque mask covering said conducting strips, said mask containing logically-spaced apertures arranged in columns along the axes of said strips and in rows perpendicular to said strips,
(e) a decoder matrix applied over said mask, said matrix including photoconductive decoder cells registering with said apertures,
(f) an output terminal on said matrix for each row of decoder cells,
(g) a bar graph display means disposed along one edge of the electroluminescent layer, said display means comprising a discrete electroluminescent segment corresponding to each matrix output terminal,
(h) a second opaque mask interposed between the display means and the electroluminescent layer, and
(i) a plurality of photoconductive lock-in cells arranged behind said second opaque mask so as to be illuminated by the electroluminescent segments, said lock-in cells being electrically connected to corresponding segments and optically coupled to neighboring higher-valued segments.

9. A readout means for a binary coded pulse signal comprising:
(a) a flat base plate,
(b) an electroluminescent layer on said base plate,
(c) a plurality of signal input terminals on said layer,
(d) a pair of conducting strips for each input terminal, the individual strips in each pair being disposed on opposite sides of the electroluminescent layer,
(e) a first opaque mask covering said conducting strips, said mask containing logically-spaced apertures arranged in columns along the axes of said strips and in rows perpendicular to said strips,
(f) a decoder matrix applied over said mask, said matrix including photoconductive decoder cells registering with said apertures,
(g) an output terminal on said matrix for each row of decoder cells,
(h) a bar graph display means disposed along one edge of the base plate, said display means comprising a discrete electroluminescent segment corresponding to each matrix output terminal,
(i) a second opaque mask interposed between the display means and the base plate, and
(j) a plurality of photoconductive lock-in cells arranged behind said second opaque mask so as to be illuminated by the electroluminescent segments, said lock-in cells being electrically connected to corresponding segments and optically coupled to neighboring higher-valued segments.

References Cited by the Examiner
UNITED STATES PATENTS

| | | | |
|---|---|---|---|
| 2,947,874 | 8/1960 | Tomlinson | 250—213 |
| 2,974,233 | 3/1961 | Loebner | 250—213 |
| 2,988,645 | 6/1961 | Wilmotte | 250—213 |
| 3,020,410 | 2/1962 | Bowerman | 250—213 |
| 3,042,807 | 7/1962 | Vize | 250—213 |
| 3,046,540 | 7/1962 | Litz et al. | 250—213 |
| 3,087,067 | 4/1963 | Nisbet et al. | 250—209 |
| 3,087,068 | 4/1963 | Bowerman | 250—213 |

OTHER REFERENCES

Loebner: "A Trace Integrating Storage Light Amplifying Panel," RCA Technical Notes, No. 323, November 1959.

RALPH G. NILSON, *Primary Examiner.*

ARCHIE BORCHELT, *Examiner.*